3,272,614
METHOD OF COMBATTING AQUATIC LIVING ORGANISMS

Robert J. Herschler and Wilbur L. Shilling, Camas, Wash., assignors to Crown Zellerbach Corporation, San Francisco, Calif., a corporation of Nevada
No Drawing. Filed July 2, 1963, Ser. No. 292,483
13 Claims. (Cl. 71—2.7)

This invention relates to a method of controlling aquatic plants, such as algae and higher aquatic plants; mollusks, and crustaceans.

In irrigation ditches, canals, lakes, rivers, and streams of pleasure and commerce, unwanted growth of aquatic plants hinders the flow of water. Further, such growth causes high water loss from evaporation and interferes with navigation. Also, such growth passing from maturity to death and decay introduces into the water biological processes which impoverish the water of dissolved oxygen. Algae in waterways contaminate the water consuming the the nutrients present and imparting undesirable odors. Snails in waterways are undesirable since they are carriers of diseases.

It is an object of the present invention to provide a new method for the control of aquatic plants, such as algae and higher aquatic plants, mollusks, and crustaceans.

A further object is to provide a method of selectively controlling algae and higher aquatic plants without affecting terrestrial plants.

Another object of the present invention is to provide a new method of controlling aquatic living organisms set forth hereinabove by applying thereto a composition comprising at least one compound selected from the group consisting of hexachlorodimethyl sulfone and hexabromodimethyl sulfone.

Other objects will become apparent from the following specification and claims.

The term "aquatic plants" as herein employed refers to vegetative organisms growing in water in which a major part of such organisms are normally largely submerged. Such submerged parts may be roots as in Lemna, or leaves as in Vallisneria, or entire plants such as Anacharis. The term is inclusive of all water plants, such as Salvinia, which are normally free floating in their environing water as well as immersed species which are typically rooted in earth, such as Vallisneria, and species which appear to grow normally in all respects either free-floating or rooted, such as Anacharis. The term "higher aquatic plants" as herein employed refers to aquatic plants which are botanically higher than algae.

The term "control" in the sense in which it is used herein is intended to set forth the actions of killing, inhibiting growth, inhibiting reproduction and proliferation, removing, destroying and otherwise diminishing the occurrence and activity of the aquatic living organisms, or the means employed for the achievement of such actions, or the results of such actions. Thus the term "control" is held to be applicable to any of the stated actions, or any combination thereof. The term "control" is not intended in the sense of encouraging, invigorating, beneficiating, protecting, propagating, or increasing.

It has been found that the foregoing objects of the present invention may be attained by employing hexachlorodimethyl sulfone, hexabromodimethyl sulfone or a mixture thereof.

The methods of preparation of these compounds are well known in the art. One method of preparing hexachlorodimethyl sulfone is reacting an alkali metal hypochlorite and thiodiglycolic acid. Also, a known method of preparation of hexabromodimethyl sulfone is the bromination of the sodium salt of 2-propene-3-sulfonyl acetate.

A composition having a chosen concentration of a compound of this invention, while being highly effective in the control of algae and higher aquatic plants, is ineffective in controlling non-aquatic or terrestrial plants. However, in accordance with the present invention, these compounds are applied to aquatic living organisms, which application produces, inter alia, herbicidal, algaecidal and molluskacidal, effects by incorporating into the aquatic medium an effective amount thereof, i.e. an amount which upon contact with such aquatic living organisms is sufficient to control them. It has been found to be advantageous to introduce one or both compounds of this invention into an aquatic medium, such as water, adjacent to the living organisms mentioned hereinabove. The compounds in unmodified form may be introduced into the water, or they may be introduced in the form of suitable compositions whereby their distribution, dispersion, and contacting of the living organisms are facilitated.

The compounds of the present invention are solids, dispersible in water and soluble in many common organic solvents, such as acetone, lower alkly ethers, and lower alkanols. The compounds have low solubility in water. However, they are readily and conveniently adapted to be distributed in water to control the aquatic living organisms.

The concentration of the compounds of this invention in an aquatic medium may vary over a wide range. Thus a concentration of a compound of this invention in an aquatic medium as low as about 0.1 part per million is sufficient in certain cases. However, a concentration of between about 1 and about 100 p.p.m. is generally satisfactory, the optimum results being obtained at a concentration between 1 and 50 p.p.m.

The following examples illustrate, but in no way limit, the application of this invention.

Example 1

Water weeds, Elodea and Lemna, cultivated in an aqueous inorganic nutrient medium were treated with 50 p.p.m. concentration (based on nutrient medium weight) of hexachlorodimethyl sulfone and hexabromodimethyl sulfone, each in a separate container. Examination of the treated plants 1 day after treatment revealed that all the treated plants were dead. Thereafter, the treatment of the plants was discontinued and the plants were held in a fresh nutrient solution for 21 day after which time they showed no sprouting. Untreated control water plants remained healthy and growing during the test period.

Example 2

Water weeds, Elodea and Lemna, cultivated in an aqueous inorganic nutrient medium were treated with 50, 25, 10, 5 and 2.5 p.p.m. concentrations (based on nutrient medium weight) of hexachlorodimethyl sulfone. At 50 p.p.m. the plants were dead in one day. After a period of three days the water plants, even at the lowest treatment level, were dead. Untreated control water plants remained healthy and growing during the test period.

Example 3

To evaluate the effectiveness of a compound of this invention on terrestrial plants, a mixed planting of terrestrial grasses and broadleaf weeds, vegetables and flowers was treated with hexachlorodimethyl sulfone at 50 pounds per acre levels. After two weeks, there was no evidence of phytotoxicity or controlling effect, thus indicating lack of controlling effect of this compound on terrestrial plants.

Example 4

Aquariums containing water snails of various sizes were treated with 5, 25 and 50 p.p.m. of hexachlorodimethyl sulfone. At all treatment levels the snails were killed within 1 hour.

Example 5

Hexachlorodimethyl sulfone and hexabromodimethyl sulfone were separately employed to treat waters containing cultures of several algae. The type of algae used were a Chlorella, a black, a red, and a filamentous green. After 2 to 4 hours, the compounds were 100% effective against all but the red algae at 5 p.p.m. concentration level. The red algae was controlled at 50 p.p.m. concentration during the same period of time.

Example 6

A field pond containing an estimated 10,000 gallons of water was treated with 50 p.p.m. of hexachlorodimethyl sulfone. The pond was naturally infected with a vigorous growing algae (Chlorella type) and Duckweed (Lemna). Within 48 hours after the application of the compound, the water weeds and algae were dead.

Example 7

Duplicated aquariums containing the following water weeds: Salvinia, Duckweed, Vallisneria, Milfoil, Cabomba and Anacharis were treated with hexachlorodimethyl sulfone at a treatment level of 50 p.p.m. of the water. All plants were killed within 2 to 5 days.

Example 8

Duplicate aquariums containing the following water weeds: Cabomba, Milfoil, Anacharis, Bladderwart, Salvinia, Duckweed and Parrots Feather were treated with hexachlorodimethyl sulfone at a treatment level of 5 p.p.m. of the water. Examination of the plants after 5 days indicated that the treatment had severely damaged the foliage. The plants were dead within two weeks.

Example 9

An aquarium containing Teredo infested wood and rocks covered with the common barnacle. Twenty-five parts per million of hexachlorodimethyl sulfone were introduced to said aquarium and within one hour killed both Teredos and barnacles.

Example 10

Seasoned Douglas fir wood blocks were impregnated with a composition containing 10% by weight of hexachlorodimethyl sulfone, 45% by weight of acetone and 45% by weight of benzene. The treated wood blocks were affixed to untreated wood blocks infested with Teredos and barnacles in ocean waters. After 4 months, no barnacle fouling or Teredo infestation had occurred on the treated blocks.

One of the advantages of the compounds of the present invention is that they are useful over a wide range of variables contributing to the growth and development of algae and higher aquatic plants, mollusks, and crustaceans. Another advantage of the method of the present invention is the effectiveness of the compounds in controlling all known aquatic plants, mollusks, and crustaceans, while having no controlling effect on terrestrial plants. This advantage of the invention makes it possible to destroy algae and higher aquatic plants in waters, such as in lakes and canals, while preserving the terrestrial plants thereabout and therearound. It also makes it possible to use the aforementioned waters which contain the compounds of this invention to irrigate terrestrial plants, such as cotton, beans, grasses and corn, without destroying them.

Reasonable variations and modifications are possible within the socpe of the foregoing disclosure and the appended claims. Having thus described our invention in preferred embodiments.

We claim:

1. A method of controlling aquatic living organisms selected from the group consisting of aquatic plants, mollusks, and crustaceans, which method comprises applying to at least one of said organisms an effective amount of a compound selected from the group consisting of hexachlorodimethyl sulfone and hexabromodimethyl sulfone, said effective amount being sufficient to control said aquatic living organisms but insufficient to control terrestrial plants.

2. The method of claim 1 wherein said effective amount is at least about 0.1 part per million of an aquatic medium.

3. The method of claim 1 wherein said effective amount is between about 1 and about 50 parts per million of an aquatic medium.

4. The method of claim 1 wherein said compound is hexachlorodimethyl sulfone.

5. The method of claim 1 wherein said compound is hexabromodimethyl sulfone.

6. The method of claim 1 wherein said aquatic plants are higher aquatic plants.

7. The method of claim 1 wherein said aquatic plants are algae.

8. The method of claim 1 wherein said living organisms are mollusks.

9. The method of claim 1 wherein said living organisms are crustaceans.

10. The method of claim 1 wherein said crustaceans are barnacles.

11. A method of controlling aquatic living organisms selected from the group consisting of aquatic plants, mollusks, and crustaceans, which method comprises applying to said organisms hexachlorodimethyl sulfone in an amount between about 1 and about 50 parts per million of an aquatic medium.

12. A method of controlling aquatic living organisms selected from the group consisting of aquatic plants, mollusks, and crustaceans, which said aquatic living organisms are located in a body of water adjacent a land area supporting terrestrial plants whose growth it is not desired to inhibit, comprising applying to at least one of said aquatic living organisms an amount of a compound selected from the group consisting of hexachlorodimethyl sulfone and hexabromodimethyl sulfone effective to control said aquatic living organisms but ineffective to control said terrestrial plants.

13. The method of claim 12 wherein said aquatic living organisms are aquatic plants.

References Cited by the Examiner

UNITED STATES PATENTS

| | | | |
|---|---|---|---|
| 2,576,082 | 11/1951 | Tischler | 71—2.5 |
| 2,628,982 | 2/1953 | James | 71—2.5 |
| 2,959,517 | 11/1960 | Bower | 167—22 |
| 3,031,483 | 4/1962 | Koopmans | 167—30 |
| 3,051,757 | 8/1962 | Johnston | 167—22 |

OTHER REFERENCES

Deschiens, R, et al.: Chem. Abstracts, 57 (1962), p. 17136C.

Waugh et al.: Chem. Abstracts, 51 (1957), p. 9076D.

JULIAN S. LEVITT, Primary Examiner.

STANLEY J. FRIEDMAN, Assistant Examiner.